United States Patent [19]

Kawaguchi

[11] Patent Number: 4,839,693
[45] Date of Patent: Jun. 13, 1989

[54] COPYING APPARATUS

[75] Inventor: Toshikazu Kawaguchi, Osaka, Japan

[73] Assignee: Minolta Camera Kabushiki Kaisha, Osaka, Japan

[21] Appl. No.: 149,147

[22] Filed: Jan. 27, 1988

[30] Foreign Application Priority Data

Jan. 28, 1987 [JP] Japan .................................. 62-18848

[51] Int. Cl.$^4$ ............................................. G03G 15/00
[52] U.S. Cl. .................................................. 355/234
[58] Field of Search ..................... 355/8, 14 R, 3 R, 51

[56] References Cited

U.S. PATENT DOCUMENTS

| | | | |
|---|---|---|---|
| 4,519,702 | 5/1985 | Shigemura et al. | 355/8 |
| 4,561,764 | 12/1985 | Sugiura | 355/8 |
| 4,561,771 | 12/1985 | Sugiura | 355/14 R |
| 4,568,171 | 2/1986 | Ikenoue | 355/8 |
| 4,620,200 | 10/1986 | Fukai | 355/8 X |
| 4,645,328 | 2/1987 | Shiraki et al. | 355/8 |
| 4,690,545 | 9/1987 | Maehara | 355/51 |
| 4,692,021 | 9/1987 | Watanabe | 355/14 R |
| 4,693,595 | 9/1987 | Kunikawa et al. | 355/8 X |

FOREIGN PATENT DOCUMENTS

61-63831  4/1986  Japan .

*Primary Examiner*—A. C. Prescott
*Attorney, Agent, or Firm*—Price, Gess & Ubell

[57] ABSTRACT

A copying apparatus of this invention is of a moving document table type, wherein the document table moving speed after completion of scanning for a copying operation is designed to be controlled to a predetermined speed slower than the predetermined returning speed, if the document table moving speed does not increase above a predetermined returning speed. Accordingly the document table moves stably without stopping even if the document table returning speed decreases due to heavy books or other loads being placed on the document table.

9 Claims, 8 Drawing Sheets

COPYING APPARATUS

BACKGROUND OF THE INVENTION

1. Field of the Invention

The present invention relates to a copying apparatus in which scanning is carried out by allowing the document table, carrying the originals to be copied, to move against the body.

2. Description of the Prior Art

In a copying apparatus whose document table moves, the optical system is fixed to the body and the original to be copied is scanned by activating the document table relative to the body.

When a heavy and thick book is copied, the book is often held down by the operator, applying an excessively great load to the copying apparatus during moving of a document table.

For example, in a copying apparatus operating at predetermined speeds both during scanning (forward) and returning (backward), an excessively great load prevents the machine from attaining the specified speed level or causes an irregular speed range. In general, to improve copying efficiency, the returning speed is set faster than the speed for scanning, and therefore the foregoing load will create serious problems especially during a returning mode of operation. In addition, in such event the driving noise (noise generated by the motor) becomes unstable, causing the user to feel uneasy.

To cope with such circumstances, inventions such as Japanese Patent Application Laid-Open No. 61-63831 (1987) have been proposed.

This invention is directed to a copying apparatus that moves the scanning optical system relative to the copier body. The apparatus detects the moving speed of the scanning optical system, and if the result proves that the speed is slower than a predetermined value, the apparatus determines an abnormal state and stops the scanning optical system. Now, the copying apparatus that moves a document table has greater possibilities to produce improper movement of the document table due to the weight of originals as described before. However, because in such event the trouble is not caused by irregularity of the driving system, stopping the document table on all such occasions reduces greatly the operation efficiency of the copying apparatus.

SUMMARY OF THE INVENTION

Accordingly, the present invention has been made in view of the above-mentioned problems, and it is therefore an object of the present invention to provide a copying apparatus which can move a document table stably when the table cannot move at a predetermined speed due to being loaded with heavy books as originals.

It is another object of the present invention to provide a copying apparatus comprising a document table that carries originals and reciprocates in both the scanning direction to copy and in the returning direction, a driving means for reciprocating the document table in the scanning and returning directions, a detecting means for detecting the moving speed of the document table, and a control means for controlling the driving means on the basis of the detected speed by the detecting means in order to allow the document table to move at predetermined speeds in the scanning and returning direction.

In keeping with the principles of the present invention, the objects are accomplished by a unique copying apparatus equipped with means for controlling the moving speed of the document table in the returning direction to a predetermined first speed, means for comparing the detected speed by the detecting means at predetermined timings during returning of the document table with the first speed, and means for controlling the returning speed of the document table to a predetermined second speed which is slower than the first speed when the detected speed by the detecting means discloses that the returning speed is slower than the first speed.

The above and further objects and features in the invention will more fully be apparent from the following detailed description taken with the accompanying drawings.

DESCRIPTION OF THE PREFERRED EMBODIMENT

Referring to the figures shown therein, an embodiment of the present invention is described.

At first, the overall configuration of the copying apparatus is described.

Figure 1:
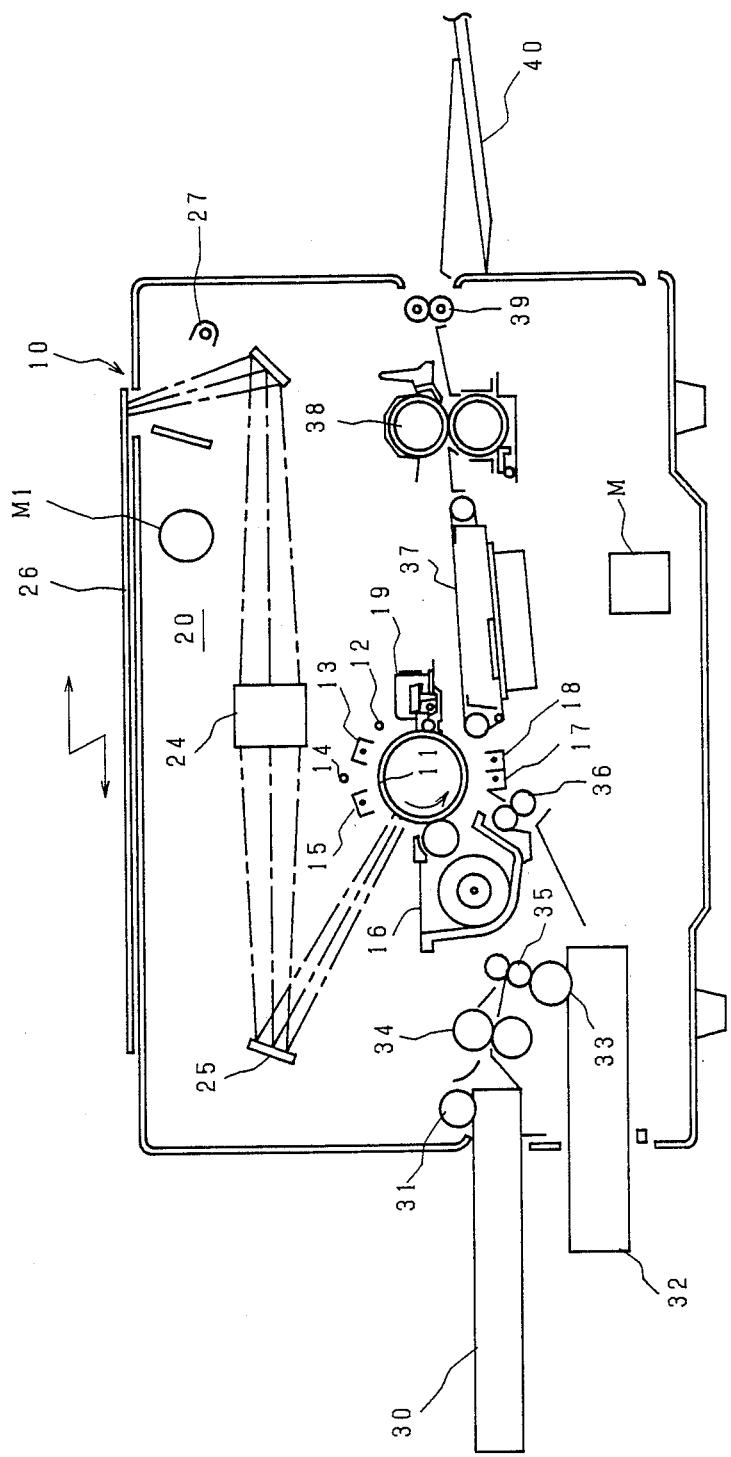
FIG. 1 is a schematic side elevation view showing the basic construction of the copying apparatus with a moving document table.

FIG. 1 shows schematically the copying apparatus with a traveling document table 26. The mechanism is basically the same as that of the conventional copying apparatus of a well-known principle.

Nearly at the center of the main body of the copying apparatus 10 is installed a photosensitive drum 11 which can be rotated counterclockwise. The drum 11 is surrounded by main eraser lamp 12, sub-electrostatic charger 13, sub-eraser lamp 14, main electrostatic charger 15, developer 16, transfer charger 17, copying paper detaching charger 18, and blade type cleaner 19. The photosensitive drum 11 has photosensitive layers provided on its surface thereof and is uniformly charged electrostatically by passing through the aforementioned eraser lamps 12, 14 and electrostatic chargers 13, 15 and the image is then projected on to it by the scanning optical system 20.

The scanning optical system 20 enables itself to scan the document image by moving the document table 26, and is composed of light source 27, mirrors 23, 25, lens 24, and a moving document table 26. The aforementioned document table 26 is driven by a DC motor M1 at a rate of v/m (where v is peripheral speed of a photosensitive drum 11, constant irrespective of equi- or variable magnification; m is copying magnification) so that it may scan while moving rightward.

On the other hand, on the left side of the copying apparatus proper, removable paper feed cassettes 30, 32 equipped with paper feed rollers 31, 33 are installed. The paper transporting route consists of two pairs of rollers 34, 35, one pair of timing rollers 36, carrier belt 37, fixing device 38, and one pair of discharge rollers 39.

In the above configuration, the main drive system including the photosensitive drum 11, transporting rollers 34, 35, carrier belt 37, and a fixing device 38 is driven by the main motor M, and a synchronous motor that rotates at a predetermined speed which is fully dependent on the AC frequency used for the main motor M. The scanning optical system 20 is driven by a DC motor M1, whose speed is variably controlled and is mechanically independent from the afore-mentioned main driving system.

To duplicate originals, feeding the copy start signal first rotates the main motor M, then drives the aforementioned main driving system including the photosensitive drum 11. Simultaneously, or with a slight time lag, the clutch of either one of paper feed rollers 31, 33 is turned on to transmit the driving power of the main motor M to the paper feed rollers which begin feeding paper together with turning on the eraser lamps 12, 14 and chargers 13, 15. Then, in a proper time lag, the exposure lamp 27 turns on and simultaneously the DC motor M1 begins rotating at a scanning speed corresponding to the copying magnification, thereby allowing the document table 26 to move rightward in the drawing as the result of the relationship described above; then the image of the original on the document table 26 is scanned and projected sequentially on the photosensitive drum 11 being rotated, forming an electrostatic latent image on the surface of the photosensitive drum 11.

The electrostatic latent image formed on the surface of the electrostatic drum 11 passes through the section of developer 16 as the photosensitive drum 11 rotates and is developed and carried to the section of transfer charger 17 as the drum 11 further rotates. On the other hand, copying paper fed by either one of the paper feeder rollers 31, 33 comes into contact with the timing rollers 36 and is stopped temporarily. As soon as the timing rollers 36 are driven by the timing signal outputted in synchronism with the image-forming activity of the aforementioned photosensitive drum 11, the paper again begins to advance and goes into the clearance between the photosensitive drum 11 and the transfer charger 17 to be superimposed on the toner image developed on the aforementioned drum 11. After the image is transferred to the paper, the paper is detached from the photosensitive drum 11 surface and discharged to the copy receiving tray 40 outside the apparatus via carrier belts 37, and fixing device 38.

Figure 2:
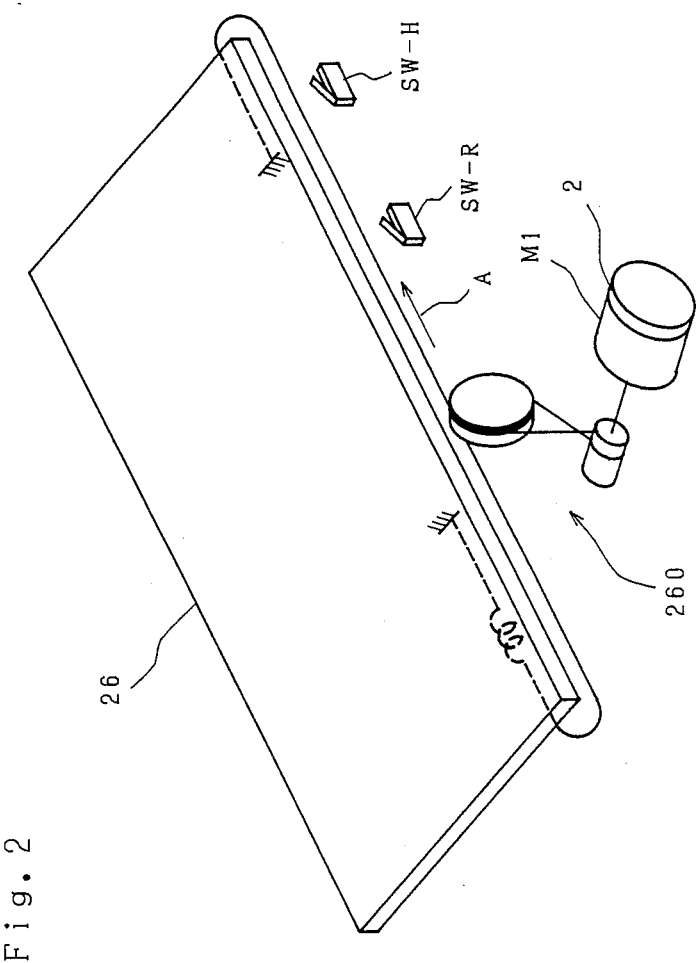
FIG. 2 is a schematic view showing the construction of the moving mechanism of the document table.

FIG. 2 shows schematically the moving mechanism of the document table 26. The document table 26 is designed to make a reciprocating movement by use of a DC motor M1 via cable driving system 260, that is, it can move rightward in the arrow direction A in the drawing (hereinafter called "scanning") and in the reverse direction (hereinafter called "returning"). This DC motor M1 has features that the smaller the number of rotations the greater is the torque. This motor M1 is not necessarily limited to DC motors.

An encoder 2 is installed at the rotating shaft of the DC motor M1 and generates pulse signals in proportion to the rotating speed thereof. It is possible to determine the document table moving distance from the pulse number generated by the encoder 2, and the moving speed from the pulse intervals.

A home switch SW-H serves to find out whether the document table 26 is located at the home position (scan start position), and delivers an ON signal when the document table 26 is located at the home position and an OFF signal for all other cases.

A registration switch SW-R serves to detect the reference position in order to deliver a timing signal and generates an ON signal when the document table 26 is located at a predetermined position and an OFF signal for all other cases.

Next discussion is dedicated to the control.

Figure 3:
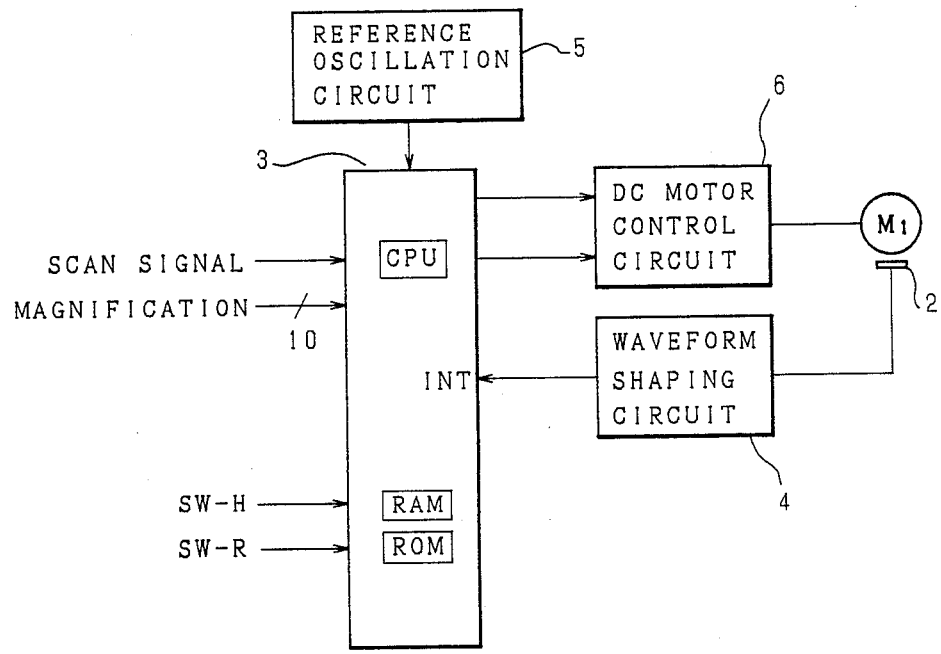
FIG. 3 is a block diagram of the control system.

FIG. 3 shows the configuration of the control unit that is used to reciprocate the document table 26.

A microcomputer 3 which forms the nucleus of the control consists of a RAM that can store the braking control data therein, a ROM, 8-bit interval counter, I/O ports, and CPU as the control headquarters and the like.

A waveform shaping circuit 4 transforms the aforementioned encoder pulse signal into a square wave, whose leading (or trailing) signal is inputted to the microcomputer 3. A reference oscillation circuit 5 generates the reference pulse of a fixed frequency to the microcomputer 3 in order to measure time intervals of the encoder pulse signals. The microcomputer 3 counts the pulse delivered from the reference oscillation circuit 5 with the internal counter, and according to the counted value, it calculates the number of rotations of a DC motor M1, that is, moving speed of the document table 26. The DC motor control circuit 6 turns ON and OFF the power supply to the DC motor M1 in an extremely small time unit with the signals from the microcomputer 3, and controls the motor speed properly by adjusting the ON/OFF time. That is, increasing the ON duration increases speed, while shortening the ON duration decreases speed.

Here, the principal control procedure of the copying apparatus is discussed.

In a conventional copying apparatus with a moving document table 26, placing excessively heavy originals or holding them down by hand increases the load torque to the motor M1, preventing the apparatus from attaining up to a predetermined speed and causing uneasiness to users about operating noise or movement of the document table 26. Especially during returning, the moving speed is set to be higher than that during scanning, and the aforementioned phenomena frequently occur. The present invention is to prevent the foregoing problem by lowering the returning speed lower than the predetermined returning speed when the moving speed of the document table 26 does not increase to the predetermined one within a predetermined distance (or a predetermined time).

Figure 4:
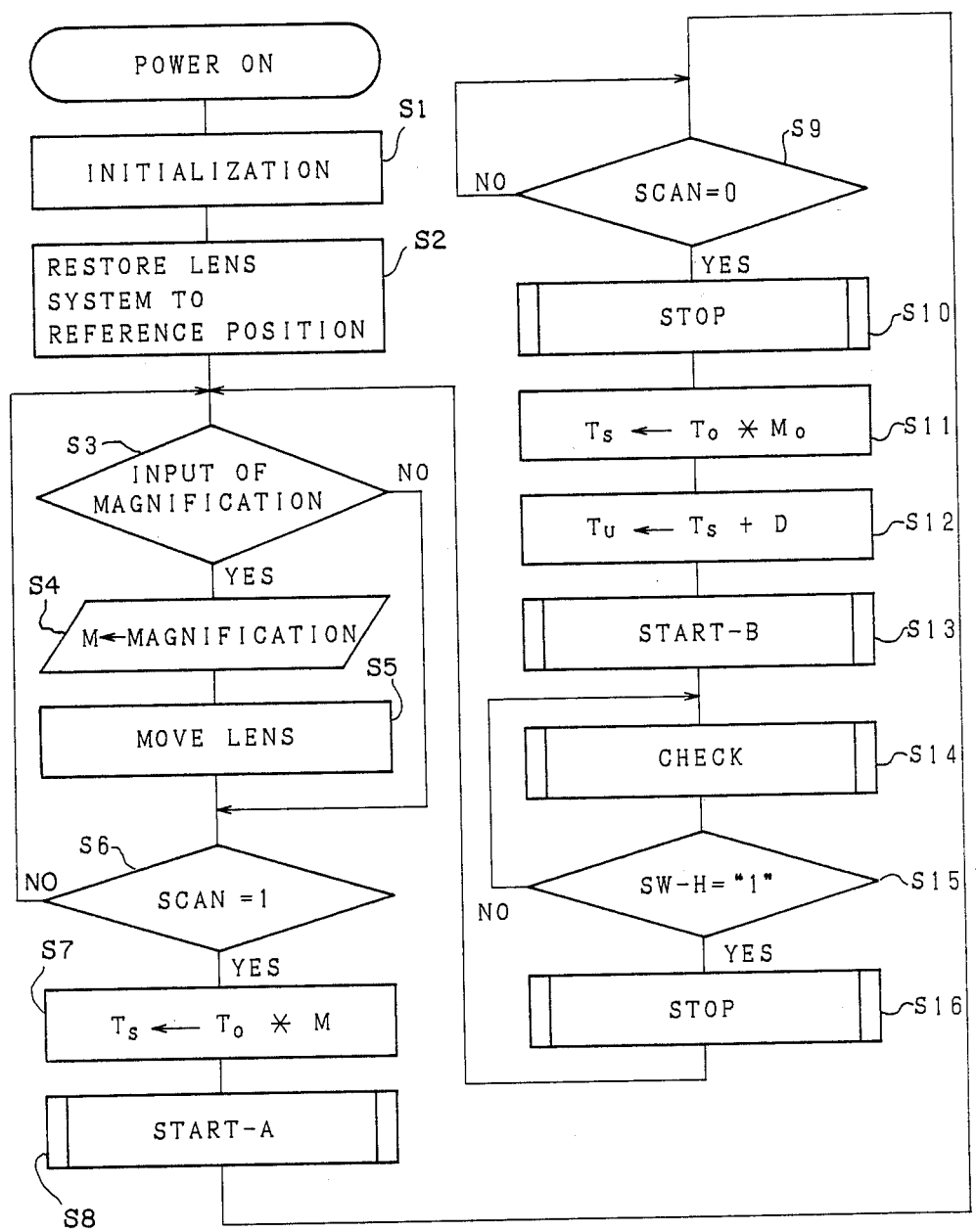
FIG. 4 is a flow chart of speed control of the document table.

This control is described by referring to the flow chart of FIG. 4.

When the power supply is turned on, CPU initializes the internal parameters (Step S1), then restores the lens 24 system to the reference position (equi-magnification position) (Step S2). Next, the CPU investigates whether magnification is inputted or not (Step S3); if magnification is inputted, the CPU reads the magnification and stores it into the magnification register M (Step S4). Then, the variable magnification system is set according to the magnification register M by moving the lens 24 (Step S5).

Then, the speed control during scanning is performed. Upon completion of setting the variable magnification system, the CPU checks the scanning timing signal SCAN which is generated in response to a depression of a print key (Step S6). If SCAN signal is "1", the CPU begins scanning, and if it is "0", the CPU returns to check the magnification input again (Step S3). When SCAN signal is "1", the CPU sets to the pulse intervals reference register Ts the pulse intervals of the encoder 2 at the time of scanning speed that corresponds to the magnification set to the magnification register M (Step S7).

The pulse interval Ts is a product of the pulse interval To of the encoder 2 at the time of equi-magnification scanning speed by the magnification M. Upon completion of setting scanning speed, the CPU uses subroutine START-A to start the interruption handling routine INT-E for motor speed control (Step S8). With this procedure, thereafter the scanning speed is kept constant by the interruption handling routine INT-E independently of the main routine. Then, in the main routine, the scanning signal SCAN is checked (Step S9). When the scanning termination timing is reached, SCAN is set to "0". Detection of SCAN being set to "0" in the main routine stops the interruption handling routine for speed control by setting the subroutine to STOP, and completes scanning (Step S10).

When scanning is completed, then the CPU carries out a control to return the scanning system (document table 26) to the scan start position (home position). In the copying apparatus with a traveling document table 26, returning speed is also controlled in view of safety. Therefore, the CPU sets the pulse intervals Ts of the encoder 2 to a predetermined returning speed during returning. To be more concrete, the pulse interval during returning is a product of the reference pulse intervals To by the minimum possible copying magnification Mo of the copying apparatus (Step S11). Then, the upper limit Tu for the encoder pulse intervals (the slower limit in terms of speed) is set (Step S12). The pulse intervals Tu as the upper limit should be the value obtained by adding a time increase factor D in view of the fact that the returning speed slows down, in reality, to some extent as compared to a predetermined pulse interval Ts of the encoder 2 during returning and also in view of the influence of noise. Upon completion of setting the returning speed, a predetermined distance is set by the subroutine START-B to start the interruption handling routine INT-E for speed control (Step S13). Thereafter, in the main routine, the CPU checks that the document table moving speed has increased to the aforementioned lower limit until the scanning system returns to the scanning start position, and if it has not reached with a predetermined distance, the CPU resets the returning speed to the second returning speed which is slower than that being predetermined (Step S14). When the scanning system returns to the scan start position (Step S15), the CPU turns off the power supply (Step S16) and stops the scanning system and the apparatus returns to the magnification input standby state (Step S3).

Next, speed control procedure is disclosed.

At first, the subroutine and interruption handling routine are described.

Figure 5:
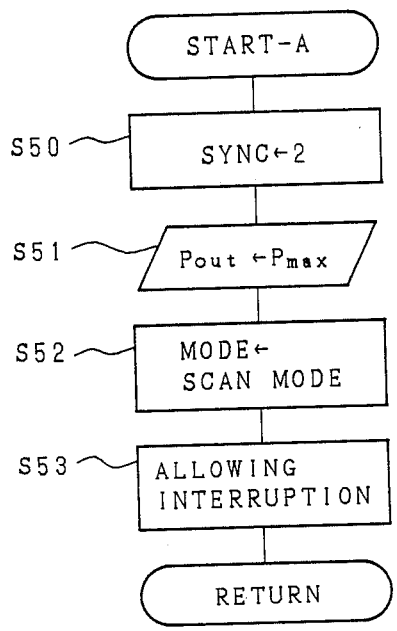
FIG. 5 is a flow chart of constant-speed control of the document table during scanning.

FIG. 5 shows the subroutine START-A for constant-speed control during scanning. First, encoder pulse number "2" is set to the register SYNC to synchronize the motor M1 encoder pulse with the interruption handling routine INT-E (Step S50). Then, supposing power Pmax is delivered for the power Pout to start the motor M1 (Step S51). Then the operation mode should be set to the scan mode (Step S52). Then the interruption is allowed (Step S53). Accordingly, thereafter, constant-speed control is carried out by the interruption handling routine INT-E.

Figure 6:
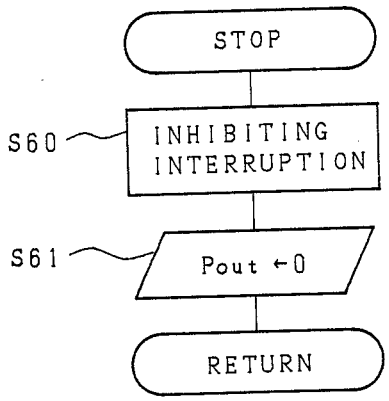
FIG. 6 is a flow chart when the document table is stopped.

FIG. 6 shows the subroutine (STOP) to stop the operation of the apparatus; this inhibits interruptions (Step S60) and zeroes the power (Step S61).

Figure 7:
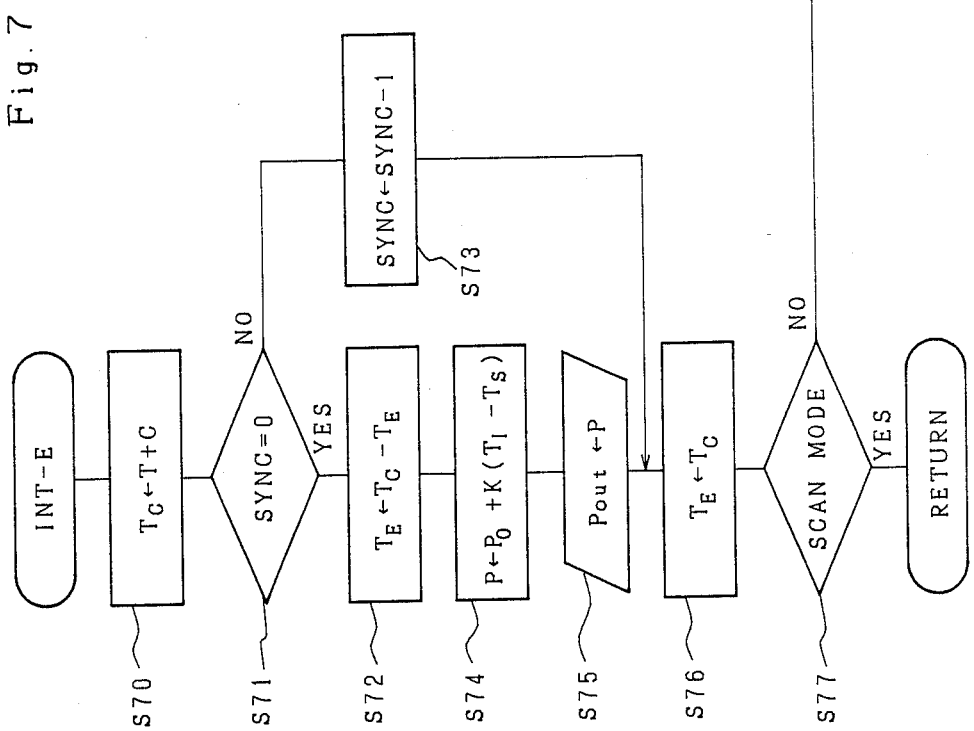
FIG. 7 is a flow chart of a motor speed control during interruption.

FIG. 7 shows a flow chart of the interruption handling routine INT-E which is started when the encoder pulse is fed to the external interruption terminals (INT) of the microcomputer 3. At first, the present reading value of the counter C is added to the reference time T to determine encoder pulse generation time Tc for this time (Step S70). Then, the register SYNC is checked to investigate whether the synchronism between encoder pulse and interruption handling routine INT-E has been completed (Step S71). If synchronism has not yet been completed, one is subtracted from SYNC (Step S73) and the encoder pulse generation time Tc for this time is stored in the register $T_E$ (Step S76).

If synchronism has been completed (SYNC=0), the former encoder pulse generation time $T_E$ is subtracted from that of this time Tc to calculate the pulse intervals $T_I$ (Step S73). The error between the pulse intervals $T_I$ and the encoder pulse intervals Ts, which corresponds to the predetermined speed is multiplied by the constant K and then, the bias value Po corresponding to friction is added to determine power feed rate P to the motor M1 (Step S74). After delivering power P to the motor M1 (Step S75), the encoder pulse generation time Tc for this time is stored in the register $T_E$ (Step S76).

Next, if in the scan mode, the interruption handling routine INT-E is terminated (Step S77). The process after the step S80 shown in FIG. 7 is designated to the processing not for the scan mode but for the return mode; therefore, explanation is given when the processing is during the returning mode.

Figure 8:
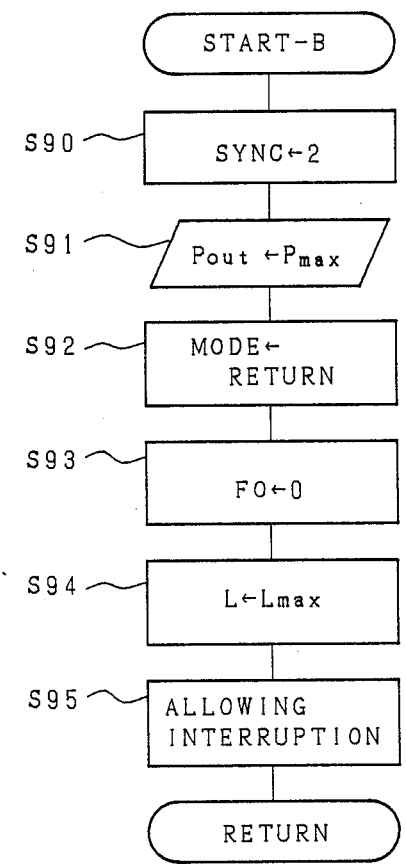
FIG. 8 is a flow chart of a constant-speed control of the document table during returning.

Next discussion is dedicated to speed control during returning. FIG. 8 shows the subroutine STAR-B for constant-speed control during returning. Same as during scanning, the synchronous register SYNC is set (Step S90), the starting power flow rate is set (Step S91), and the operation mode is set to RETURN (Step S92). Then, pulse comparison flag FO is set to "0" (Step S93). Here, when the encoder pulse interval $T_I$ corresponding to moving speed of the scanning system is greater than the upper limit (when the actual returning speed is slower than the lower limit), the pulse comparison flag FO is set to "0", and "1" in the reverse case. And the pulse number Lmax corresponding to a predetermined distance is set to the distance counter L (Step S94). The subsequent subroutine CHECK is used to investigate whether the moving speed exceeds a predetermined level before finishing of this distance counting.

Then the interruption is allowed (Step S95). Accordingly, thereafter, the interruption handling routine INT-E carries out constant-speed control.

At this section, discussion is made on the activities during returning, whose explanation has been omitted in FIG. 7 mentioned above. During returning in the interruption handling routine INT-E, the CPU determines NO at the step S76 and advances to the step S80. Here the CPU compares the actual pulse intervals $T_I$ and the upper limit Tu. If $T_I$ is greater than the upper limit Tu (when moving speed is slow), the CPU sets the pulse comparison flag FO to "0" (Step S81) and if it is smaller, the CPU sets the FO to "1" (Step S82). Then the CPU checks the distance counter L (Step S83), and if it is in operation, the CPU subtracts 1 from the distance counter L (Step S84).

Figure 9:
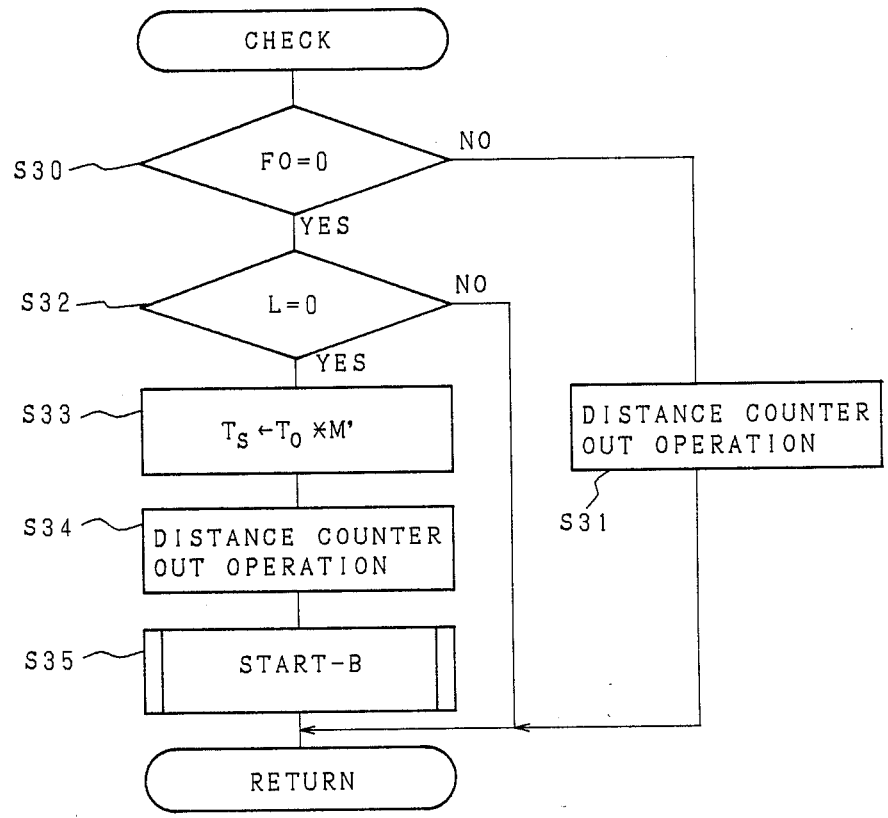
FIG. 9 is a flow chart of a constant-speed control of the document table during returning.

FIG. 9 shows the flow chart of the subroutine CHECK that checks whether the returning speed has reached the scheduled speed within a specified distance (pulse count value Lmax) from the start of returning. This is the most important part in this embodiment. At first, CPU checks whether the pulse comparison flag FO is "0" or not (Step S30), and if it is "1" (if traveling speed exceeds the lower limit), CPU stops counting of the distance counter L, preventing it from counting further (Step S31).

In case of "0" (when traveling speed is slow), the CPU investigates whether the distance counter L has reached "0" (Step S32), and if the distance counter L is 37 0", the CPU determines that returning speed has not reached the lower limit setting within a specified distance Lmax (value set at Step S94 shown in FIG. 8) and sets newly the pulse intervals Ts corresponding to the second returning speed that is one step slower than the aforementioned predetermined returning speed (Step S33). This pulse interval Ts is the encoder pulse interval at the speed equivalent to that corresponding to magnification M'o, which is greater than Mo (magnification corresponding to the initial returning speed). And after changing the speed setting, the CPU stops counting of the distance counter, and allows the scanning system to travel at a new and slower speed (Step S34–S35).

As described above, in the copying apparatus of the present invention, if the document table 26 cannot accelerate to a desired speed within the predetermined distance, the CPU works to decelerate the speed to allow the motor to rotate at a given speed, thereby a ensuring stable document table 26 operation, and achieving a stable speed and noise to give users a feeling of security. In addition, this can absorb pulse fluctuations due to noise.

Taking a specified distance before the detection provides users with enough time to release (or alleviate) the force pressing against the document table 26, increasing the possibility of returning the document table 26 at a specified speed.

In the present invention, the second returning speed can be equal to the scanning speed. What is important is that the second returning speed should be slower than a usual returning speed.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A copying apparatus comprising:
a document table which carries originals and reciprocates in both a scanning direction for copying and a returning direction;
a driving means for reciprocating said document table in said scanning and returning directions;
a detecting means for detecting the moving speed of said document table; and
a control means for controlling said driving means on the basis of detected speed by said detecting means in order to move said document table at predetermined speeds in said scanning and returning directions, wherein said control means comprises, means for controlling the moving speed of said document table in said returning direction to a predetermined first speed, means for comparing the detected speed by said detecting means at predetermined timings during the returning of said document table with said first speed, and means for controlling the returning speed of said document table to a predetermined second speed which is slower than said first speed when the speed detected by said detecting means is slower than said first speed.

2. A copying apparatus as set forth in claim 1, wherein said first speed is higher than the moving speed of said document table in the scanning direction.

3. A copying apparatus as set forth in claim 1, wherein said second speed is equal to the moving speed of said document table in the scanning direction.

4. A copying apparatus as set forth in claim 1, wherein said first speed is higher than the moving speed of said document table in the scanning direction and said second speed is equal to the moving speed of the document table during the scanning speed.

5. A copying apparatus comprising:
a document table which carries originals and reciprocates in both a scanning direction for copying and a returning direction;
a driving means for reciprocating said document table in said scanning and returning directions;
a detecting means for detecting the moving speed of said document table; and
a control means for controlling said driving means on the basis of detected speed by said detecting means in order to move said document table at predetermined speeds in said scanning and returning directions;
a measuring means for measuring the moving distance of said document table from start position in the returning direction is further provided, and
said control means comprises, means for controlling the moving speed of said document table in said returning direction to a predetermined first speed, means for comparing the detected speed by said detecting means at predetermined timings when a predetermined distance has been measured by said measuring means with said first speed, and means for controlling the returning speed of said document table to a predetermined second speed which is slower than said first speed when the speed detected by said detecting means is slower than said first speed.

6. A copying apparatus as set forth in claim 5, wherein said first speed is higher than the moving speed of said document table in the scanning direction.

7. A copying apparatus as set forth in claim 5, wherein said second speed is equal to the moving speed of said document table in the scanning direction.

8. A copying apparatus as set forth in claim 5, wherein said first speed is higher than the moving speed of said document table in the scanning direction and said second speed is equal to the moving speed of the document table during the scanning speed.

9. In a copier having a moving document table for carrying an original past a copying station, the improvement comprising:

means for monitoring the speed of movement of the document table and producing a corresponding representative signal;

means for controlling the speed of movement of the document table, and means for comparing the representative signal with a predetermined signal representative of a first speed and if the representative signal is below the predetermined signal than the means for controlling is caused to reduce the document table speed and the copying operation to a lower speed.

* * * * *